United States Patent
Campbell et al.

(10) Patent No.: US 7,298,558 B2
(45) Date of Patent: Nov. 20, 2007

(54) ELECTRONIC ADJUSTABLE COLOR FILTER DEVICE

(75) Inventors: Scott Patrick Campbell, Thousand Oaks, CA (US); Bing Wen, Camarillo, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 224 days.

(21) Appl. No.: 11/240,875

(22) Filed: Sep. 30, 2005

(65) Prior Publication Data

US 2007/0076300 A1   Apr. 5, 2007

(51) Int. Cl.
*G02B 27/14* (2006.01)
*G02B 5/04* (2006.01)
*G02B 5/30* (2006.01)
*G03B 21/14* (2006.01)

(52) U.S. Cl. .................. 359/634; 359/636; 359/638; 359/833; 359/900; 359/494; 359/495; 359/502; 353/20

(58) Field of Classification Search .............. 359/618, 359/629, 634, 636, 638, 833, 900, 490, 494–498, 359/502; 353/20, 31, 33, 34, 37, 81; 349/9
See application file for complete search history.

(56) References Cited

U.S. PATENT DOCUMENTS

| | | | |
|---|---|---|---|
| 6,704,144 B2 * | 3/2004 | Huang .......................... | 359/634 |
| 6,819,497 B2 * | 11/2004 | Suzuki et al. ............... | 359/634 |
| 6,961,179 B2 * | 11/2005 | Chen et al. .................. | 359/485 |
| 7,204,592 B2 * | 4/2007 | O'Donnell et al. ............ | 353/7 |
| 2007/0146880 A1 * | 6/2007 | Bleha et al. ................ | 359/468 |

* cited by examiner

*Primary Examiner*—Ricky Mack
*Assistant Examiner*—Jack Dinh
(74) *Attorney, Agent, or Firm*—Glenn H. Lenzen, Jr.; Wayne M. Chancellor

(57) ABSTRACT

An electronically adjustable, combinational color filter device is provided for generating color light. Incoming light is split in a polarizing beam splitter/combiner into a first and a second element of light. One or more wave plates operate to modify the polarization state of the first element of light, and one or more dichroic reflective filters reflect portions of the first element of light having a predetermined wavelength. Similarly, one or more wave plates operate to modify the polarization state of the second element of light, and one or more dichroic reflective filters reflect portions of the second element of light having a predetermined wavelength. Reflected portions of the first element and the second elements of light are combined in the polarizing beam splitter/combiner to create color light. A spatial light modulator may be used to create color images.

4 Claims, 3 Drawing Sheets

ELECTRONIC ADJUSTABLE COLOR FILTER DEVICE

FIELD OF THE INVENTION

This invention relates generally to color filters. More particularly, this invention relates to an electronically adjustable color filter that selectively combines filtered elements of light to create color light.

BACKGROUND

Color lighting systems are found in a variety of entertainment facilities, to include theaters, auditoriums, concert halls and stadiums. Regardless the size of the venue, in almost all instances a color lighting system is required or desired. The quality of the entertainment provided is often dependent, in part, on the quality of the color lighting system.

Aside from professional and amateur entertainment venues, theme parks and other such attractions use color light to enhance the experience of their customers. Private and public facilities, such as churches and museums, also have a need for variable color lighting. Further, sales oriented facilities and events, to include shopping malls and trade shows, rely on color lighting to help market products. Also, there are many scientific/engineering applications where discriminating color light is important. It is simply a fact of life that color lighting is part of almost every person's daily routine.

Typically, color light systems include a broad band, white light source, the output of which must be filtered to produce the desired color(s) of light. Often, the broadband light is unpolarized, and a portion of the light is reflected ("thrown away") in a first, polarizing step. The loss of 50% or more of the incoming light at the onset reduces the intensity of the generated light, as well as the variations in color that may be achieved.

In many instances, color filtering includes the use of "color wheels". Generally speaking, color wheels rely on the movement (rotation or otherwise) of color filters into and out of optical alignment with a transmitted white light. In many instances, the color filters are dichroic filters, which is to say they filter (reflect or absorb) light within one wavelength band and pass through all remaining light. The filters may be glass, gelatin, or other transparent/semi-transparent materials. Often, the number of possible color combinations is limited by the number of color filters that can be mounted into the color wheel. Further, the clarity of colors is affected by filter movement, alignment, etc.

Absorption is the most prevalent means for filtering colored light. Unfortunately, absorbed light can generate significant quantities of heat which must be dissipated by the lighting system. Operational heating also limits the optical power of a system, as there is a direct correlation between optical power and absorbed heat. System cooling requirements typically require active (e.g. fans) or passive (e.g. cooling fins) cooling subsystems. In addition to heating concerns, standard color wheel systems include multiple moving, mechanical components. The process of changing colors is distracting to the audience. Also, moving parts impede or limit the response time/speed of a system, as well as reduce system reliability. In most instances, the useful operational life of a system is severely limited by reliability issues.

Pixilated color lighting systems are yet another lighting option found in the prior art. Unlike color wheel systems which are subtractive (filtering) in nature, pixilated systems are additive. Stated differently, pixilated systems achieve desired color combinations by adding colors together at a level unresolved by the naked human eye. Red, green and blue pixels produce an image on a screen, or alternatively direct color light to a designated region. Fiber optics or other delivery methods carry the colored light from light sources to the pixilated surface. Although operationally cooler, and void of multiple moving parts, pixilated systems are not without their limitations. A ⅔ decrease in light intensity results from the use of a broadband while light source and red, green and blue pixel elements. To obtain red, green and blue light from the broadband white light, the light must pass through a matrix of red, green and blue absorptive "dots". On each dot or pixel, two of the three colors (i.e. green and blue on a red dot) are absorbed. Therefore, by converting the broadband white light to red, green, and blue, ⅔ of the light is lost in the conversion. This loss precedes any further losses associated with transmitting and mixing the light.

In addition to needing color light, venues such as theaters, theme parks and trade shows often desire to shape the color light to create various images. The methods used, e.g. gobos or reflective display devices, are often times separate from the color lighting system. Integration, therefore, of the color lighting system and the imaging generating device can be cumbersome and inefficient.

Hence, there is a need for a color filter device and color filter system that overcome one or more of the limitations discussed above.

SUMMARY

The electronic combinational color filter devices and color filter system herein disclosed advance the art and overcome problems articulated above by providing electronically adjustable wave plates and dichroic reflective filter elements to selectively generate light having a desired color.

In particular, and by way of example only, in one embodiment an electronic combinational color filter is provided including: a plurality of wave plates structured and arranged to alter a polarization state of incoming light; a first plurality of dichroic reflective filters, each filter optically aligned with a corresponding wave plate to reflect a first element of the incoming light having a predetermined wavelength; a second plurality of dichroic reflective filters, each filter optically aligned with a corresponding wave plate to reflect a second element of the incoming light having a predetermined wavelength; and a polarizing beam splitter/combiner, positioned to split the incoming light into the first element of light and the second element of light, and to combine light reflected from the first plurality of dichroic reflective filters and the second plurality of dichroic reflective filters, to generate color light.

In another embodiment, an electronic combinational color lighting system is provided, including: a light source for generating light; a plurality of wave plates structured and arranged to alter a polarization state of the light; a first plurality of dichroic reflective filters, each filter optically aligned with a corresponding wave plate to reflect a first element of the light having a predetermined wavelength; a second plurality of dichroic reflective filters, each filter optically aligned with a corresponding wave plate to reflect a second element of the light having a predetermined wavelength; a polarizing beam splitter/combiner, positioned to split the light into the first element of light and the second element of light, and to combine light reflected from the first plurality and the second plurality of dichroic reflective filters, to generate color light; and a chromaticity monitor for measuring a chromaticity of the color light.

In still yet another embodiment, a method for generating color light is provided, including: receiving incoming light into a polarizing beam splitter/combiner; splitting the incoming light into a first element of light having a first polarization state and a second element of light having a second polarization state; selectively passing the first element of light through a first plurality of wave plates to alter the polarization state of the first element of light; selectively reflecting the first element of light off a first plurality of dichroic reflective filters, each filter reflecting a portion of the first element of light having a predetermined wavelength; selectively passing the second element of light through a second plurality of wave plates to alter the polarization state of the second element of light; selectively reflecting the second element of light off a second plurality of dichroic reflective filters, each filter reflecting a potion of the second element of light having a predetermined wavelength; and combining, in the polarizing beam splitter/combiner, reflected portions of the first element of light and reflected portions of the second element of light, to generate color light.

DETAILED DESCRIPTION

Before proceeding with the detailed description, it should be noted that the present teaching is by way of example, not by limitation. The concepts herein are not limited to use or application with one specific type of electronic combinational color filter device in a specific environment. Thus, although the instrumentalities described herein are for the convenience of explanation, shown and described with respect to exemplary embodiments, the principles herein may be equally applied in other types of electronic combinational color filter devices in a variety of different settings.

Figure 1:
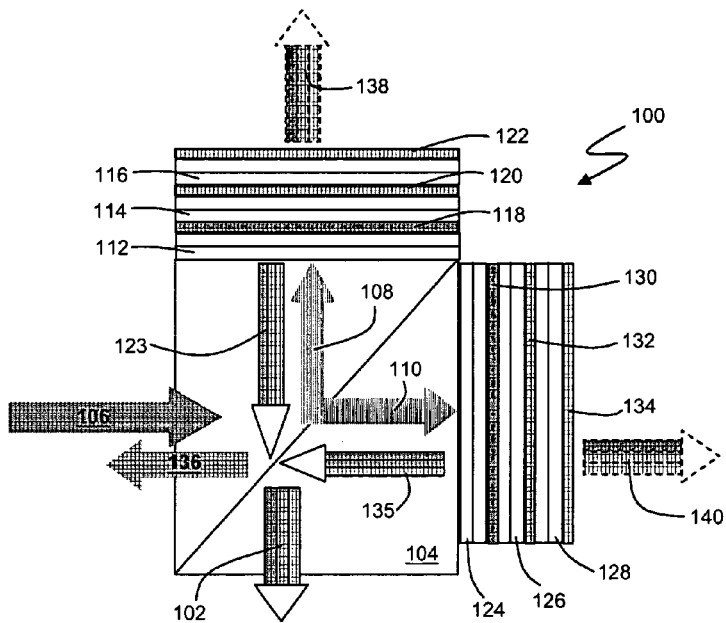
FIG. 1 is a plan view of an electronic combinational color filter device having wave plate—dichroic reflective filter pairs, according to an embodiment.

FIG. 1 illustrates an electronic combinational color filter device 100 according to the present disclosure. Color filter device 100 is a multi-color device, which is to say it filters several colors, at varying levels, to create a desired transmitted or output color light 102. It can be appreciated by those skilled in the art, however, that color filter device 100, as well as the electronic combinational color filter devices disclosed below, may be used to filter a single color. Further, device 100 may be used for polarization spectrum control, which may include polarization spectrum control as a function of color. The primary advantages of the electronic combinational color filter devices disclosed herein, which include maximum light efficiency/use of light, independent color control, thermal stability, etc., are recognized regardless the number of separate colors and polarizations addressed by the filter.

Continuing with FIG. 1, a polarizing beam splitter/combiner 104 is positioned to receive light 106 from a light source (not shown). In one embodiment, light 106 is broadband, white light, however, light 106 may be any type of light to include laser light, etc. Light 106 is subsequently split into a two light elements 108, 110 by polarizing beam splitter/combiner 104, each element having a known polarization state. Specifically, light 106 is split into "s" polarized light 108, which is reflected by polarizing beam splitter/combiner 104, and "p" polarized light 110, which is transmitted by polarizing beam splitter/combiner 104.

As shown, a plurality of wave plates, of which wave plates 112, 114 and 116 are exemplary, are optically aligned with light element 108. The wave plates 112-116 may be controlled to alter the polarization state of light element 108, therefore the wave plates may be referred to as "tunable". Wave plates 112-116 may be any of a type well known in the art, to include but not limited to electro-optically tunable wave plates and/or mechanically rotated crystalline wave plates. By altering the voltage applied to a wave plate (e.g. wave plate 112) the polarization of element 108 may be altered.

Positioned adjacent to, and sequentially following, each wave plate 112-116 is a dichroic reflective filter, e.g. filters 118, 120 and 122. In general, dichroic reflective filters reflect light in a select wavelength band. In one embodiment, dichroic reflective filters 118-122 are cholesteric films, which is to say they reflect light having a wavelength in a select wavelength band and a discrete polarization state (e.g. left-hand polarized). As represented in FIG. 1, color filter device 100 may include multiple filters to filter a variety of colors, for example blue, green and red. Additional dichroic reflective filters, such as a yellow or a cyan filter, may be included in color filter device 100, or alternatively they may be substituted for the filters 118-122 depicted in FIG. 1.

As shown in FIG. 1, two or more "wave plate-dichroic reflective filter" pairs may be "stacked" or positioned such that each pair is optically aligned with, and contacting, at least one other pair. As is discussed in greater detail below, it is not required, however, that the wave plates and dichroic reflective filters be in contact to be effective. Optical alignment and coupling, which may include the use of optical mirrors to redirect light, is a relevant factor, as further amplified in FIGS. 2 and 3.

A second set of wave plates 124, 126 and 128 are optically coupled with light element 110. As discussed above, light element 110 has an initial polarization state different from that of element 108, i.e. a "p" polarization. Similar to wave plates 112-116, wave plates 124-128 are structured and arranged to electronically alter the polarization state of light element 110. Varying the voltage applied to one or more of the wave plates 124-128 will modify or alter the polarization state of element 110. The degree to which the polarization state is altered, and the manner in which it is altered, depends on the type of wave plate and the voltage applied. As with wave plates 112-116, wave plates 124-128 may be any of a type well known in the art, to include but not limited to, twisted nematic, dual frequency, cholesteric, and mechanically rotated crystal quartz wave plates Positioned adjacent to, and sequentially following, each wave plate 124-128 is a dichroic reflective filter, e.g. filters 130, 132 and 134. In one embodiment, dichroic reflective filters 130-134 are cholesteric films. As with filters 118-122, color filter device 100 may include multiple filters 130-134 addressing a variety of colors. In one embodiment, filters 130-134 address the same colors as filters 118-122. In yet another embodiment, one or more of the filters 130-134 address a color not addressed by filters 118-122.

In operation, electronic combinational color filter device 100 receives light 106 from a light source (not shown) which may, or may not, be part of a color filter system. Polarizing beam splitter/combiner 104 splits beam 106 into two elements, each element having a known polarization state, i.e. "s" and "p" polarization. In particular, a percentage of light 106 is split into light element 108, wherein light element 108 is "s" polarized. The remaining percentage of light 106 is transmitted as light element 110, wherein light element 110 is "p" polarized.

As light element 108 strikes wave plate 112, a voltage is applied to wave plate 112. The polarization state of light element 108 is subsequently altered. The degree of alteration depends on the voltage applied to wave plate 112. In this way, wave plate 112 controls the polarization state or states of light element 108. For example, as "s" polarized light element 108 contacts wave plate 112, some portion of the polarization state of light element 108 is altered. In particular, some portion of light element 108 may be converted to a right or left-hand polarization.

Light element 108 subsequently passes through wave plate 112 and contacts dichroic reflective filter 118. Dichroic reflective filter 118 is positioned to reflect that portion of light element 108 having a wavelength within a known wavelength band. The predetermined wavelength corresponds to the wavelength of a single color, which is a wavelength of light in the visible, NIR, MWIR, etc. ranges of the Electromagnetic Spectrum (the "EM Spectrum"). If, for example, dichroic reflective filter 118 is intended to filter and control the color red, the wavelength of concern would be in the range of approximately 622-780 nanometers. If the color to filter is blue, the wavelength would be in the range of approximately 455-492 nanometers, and if it is green, the wavelength would be approximately 492-577 nanometers. All other light of element 108, i.e. light having a different wavelength, is transmitted through dichroic reflective filter 118.

As one part of light element 108 reflects off of filter 118, for example all "blue" light, the "handness" of the reflected light changes, e.g. from right-hand polarized to left-hand polarized. As the reflected blue light, which is part of reflected light 123, passes back through polarizing beam splitter/combiner 104, that portion which is "p" polarized is transmitted through polarizing beam splitter/combiner 104. The light becomes part of the color light 102 ultimately transmitted by color filter device 100. All "s" polarized light is reflected in polarizing beam splitter/combiner 104, and becomes part of the light 136 discarded by the device 100.

After passing through dichroic reflective filter 118, the remaining light of element 108 subsequently passes through wave plate 114. Similar to wave plate 112, the polarization state of the light passing through wave plate 114 is altered. In this manner, wave plate 114 acts to control the polarization state(s) of the remaining light of light element 108. Once again, the percentage of light altered depends upon the voltage applied to wave plate 114. The remaining light of light element 108 then contacts dichroic reflective filter 120, and that portion of light element 108 having a predetermined wavelength, is reflected. In this instance, dichroic reflective filter 120 operates to reflect light having a different wavelength of the EM spectrum than the light reflected by dichroic reflective filter 118, for example green light. The polarization state of the reflected green light is "flipped" and all "p" polarized green light passing back through polarizing beam splitter/combiner 104 is transmitted, while all "s" polarized green light is reflected.

The process of first passing a remaining portion of light of element 108 through a wave plate 116 to alter the polarization state, and then reflecting a portion of the modified light element 108 off a dichroic reflective filter 122, repeats for a third time. The predetermined operational wavelength of dichroic reflective filter 122 is different than the wavelength of filter 118 and filter 120, which is to say dichroic reflective filter 122 reflects light of a different color, for example the color red. As with the blue and the green light, the "red" portion of reflected light 123 having a "p" polarization state is transmitted and becomes part of the output light 102. All "s" polarized light is reflected in the polarizing beam splitter/combiner 104 to become part of discarded light 136. The light reflected by dichroic reflective filters 118, 120 and 122 combines with other light, as described in detail below, to form the transmitted, output light 102.

Concurrent with the selective modification of light element 108, light element 110 travels along a different path toward a series of "wave plate-dichroic reflective filter" pairs. Initially, light element 110 is "p" polarized, however, the polarization state of the light element 110 changes in the operation of device 100. The sequencing of the wave plates 124, 126, 128, and the dichroic reflective filters 130, 132, 134, optically aligned with light element 110 is substantially the same as that described for light element 108. Stated differently, in at least one embodiment, dichroic reflective filter 130 operates to reflect light in the same wavelength band as dichroic reflective filter 118. Similarly, dichroic reflective filters 132 and 134 reflect light in the same wavelength bands as dichroic reflective filters 120 and 122 respectively.

The reflected color light 135 of light element 110 ultimately consists of "s" and "p" polarized blue, green and red light. The "p" polarized light exits the polarizing beam splitter/combiner 104 in the direction of the source of light 106, wherein it becomes part of the light 136 discarded by the system and converted to heat. The "s" polarized light is reflected to become part of the color light 102 transmitted from electronic combinational color filter device 100. The color of light 102 may be constantly modified by altering the voltages applied to various wave plates 112-116 and 124-128. Furthermore, by separately controlling wave plates 112-116 and 124-128, the output light 102 can be made to have a controllable polarization state, as described below.

In addition to controlling the color of output light 102, the polarization can be tailored as well. For example, by controlling wave plates 112-116 such that all of the reflected light 123 is "p" polarized, all of light 123 passes through polarizing beam splitter/combiner 104 and becomes part of output light 102. Further, by controlling wave plates 124-128 such that all of reflected light 135 is "p" polarized, all of light 135 passes through polarizing beam splitter/combiner 104 as part of discarded light 136. In this manner, output light 102 can be tailored to have only a "p" polarization. Alternatively, light 102 may be tailored to only have a "s" polarization state.

Considering this embodiment further, it is possible, for example, to tailor individual colors such that all of the blue light in output light 102 is "p" polarized, all of the red light in output light 102 is "s" polarized, and the green light in output light 102 is a combination of "s" and "p" polarized light. Depending on the integration of color filter device 100 with other systems and subsystems, this tailoring of color and polarization can be advantageous. It can be appreciated that the examples presented herein are for illustration purposes only, and other combinations of color and/or color-based polarization may be achieved by device 100.

In yet another embodiment, filters 118-122 and 130-134 may be cholesteric filters or films. In this embodiment, all light within a specific wavelength band (e.g. all "red" light), having a predetermined polarization state (e.g. right-hand polarized), will be reflected by the cholesteric filters corresponding to that wavelength band (e.g. filters 122 and 134 for the color red). As shown in phantom in FIG. 1, all other light in the wavelength band of interest passes through color filter device 104. The same may be said for the "blue" and "green" color light, such that the light exiting device 104, along the same paths as light elements 108 and 110 (light 138 and 140 respectively), is a combination of all three colors. In this embodiment, the light 136 discarded by device 100 and converted into heat may therefore be reduced.

Figure 2:
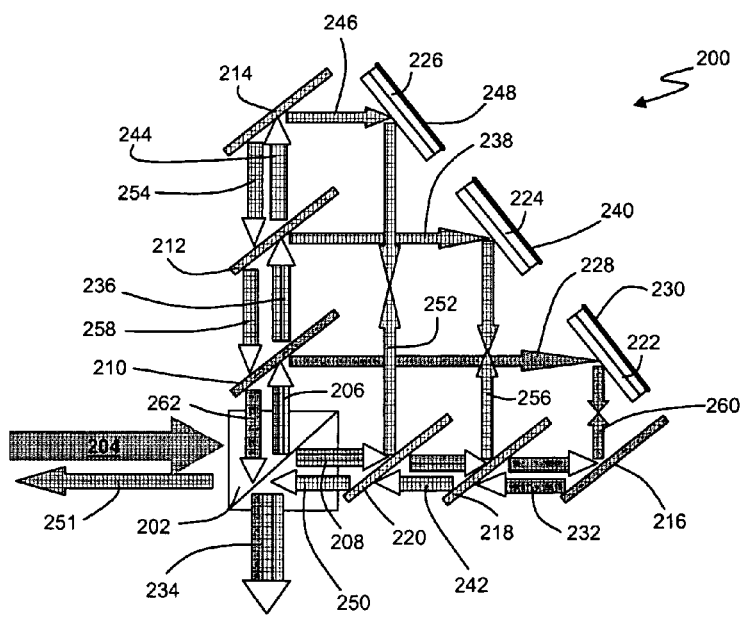
FIG. 2 is a plan view of an electronic combinational color filter device having one set of wave plates and two sets of dichroic reflective filters, according to an embodiment.

Referring now to FIG. 2, yet another embodiment of the present disclosure is depicted. Electronic combinational color filter device 200 includes a polarizing beam splitter/combiner 202 optically aligned with incoming light 204. In at least one embodiment, light 204 is broadband, white light. Light 204 is subsequently split into two light elements 206, 208, each having a known polarization state, i.e. a "s" polarization and a "p" polarization, respectively.

Optically aligned with light element 206 is a plurality of dichroic reflective filters 210, 212 and 214. Likewise, a plurality of dichroic reflective filters 216, 218 and 220 are optically aligned with light element 208. As shown, dichroic reflective filters 216-220 are also oriented substantially parallel to dichroic reflective filters 210-214. Of note, in the embodiment presented in FIG. 2, the sequencing of dichroic reflective filters 210-214 is identical to that of dichroic reflective filters 216-220 respectively. For example, if the dichroic reflective filter 210, aligned with light element 206, reflects blue light (light having a wavelength in the band of approximately 455-492 nanometers), then the dichroic reflective filter 216, aligned with light element 208, will also reflect light in this wavelength band. Further, if dichroic reflective filter 212 reflects light falling within the wavelength band of 492-577 nanometers (green light), dichroic reflective filter 218 will also operate to reflect green light. Finally, if dichroic reflective filter 214 (aligned with light element 206) reflects red light (622-780 nanometers), dichroic reflective filter 220 (aligned with light element 208) also reflects red light.

As shown in FIG. 2, an electronically controllable wave plate, e.g. wave plate 222, is optically coupled to a "pair" of dichroic reflective filters operating over a specified wavelength band (e.g filters 210 and 216 which operate to reflect blue light). In addition to wave plate 222, wave plate 224 is optically coupled to filters 212 and 218, and wave plate 226 is optically coupled to filters 214 and 220. In this manner, the wave plates 222-226 are structured and arranged to alter the polarization state of both the first element of light 206 and the second element of light 208. Each dichroic reflective filter 210-220 also operates on both elements of light 206, 208, to reflect all or some portion of each element 206, 208 having a wavelength corresponding to the operational wavelength band of a given filter.

In particular, in the operation of color filter device 200, incoming light 204 is split by polarizing beam splitter/combiner 202 into the first element of light 206 having a "s" polarization, and the second element of light 208 having a "p" polarization. The first element of light 206 is reflected toward a first dichroic reflective filter 210, wherein light having a wavelength within a specified wavelength band (e.g. approximately 455-492 nanometers or "blue" light) is reflected toward wave plate 222. All other light of element 206 passes through filter 210. The reflected blue light 228 strikes and passes through wave plate 222. In doing so, the polarization state of all or a portion of light 228 is altered or modified. All of light 228 reflects off a mirror 230 positioned on the back side of wave plate 222, and is directed toward dichroic reflective filter 216. Dichroic reflective filter 216 also reflects light having a wavelength within a specified wavelength band (e.g. a wavelength in the wave band corresponding to blue light). The reflected light 232 is directed toward polarizing beam splitter/combiner 202, wherein that portion of light 232 having a "s" polarization is reflected to become part of output light 234. The portion of light 232 which is "p" polarized, by virtue of the alteration induced by wave plate 222, transmits through polarizing beam splitter/combiner 202.

The remaining light 236, passing through dichroic reflective filter 210, contacts a second dichroic reflective filter 212, wherein light having a wavelength in the wave band 492-577 nanometers ("green" light) is reflected toward a second wave plate 224. Reflected green light 238 strikes and passes through wave plate 224. In doing so, the polarization state of light 238 is altered or modified. All of light 238 reflects off a mirror 240 positioned on the back side of wave plate 224, and is directed toward dichroic reflective filter 218. Dichroic reflective filter 218 reflects light having a wavelength within a specified wavelength band (e.g. green light). The reflected light 242 is directed toward polarizing beam splitter/combiner 202, wherein that portion of light 242 having a "s" polarization is reflected to become part of output light 234. The portion of light 242 which is "p" polarized, by virtue of the alteration induced by wave plate 224, transmits through polarizing beam splitter/combiner 202.

The process disclosed above repeats for a third time. The remaining light 244, passing through dichroic reflective filter 212, contacts a third dichroic reflective filter 214, wherein light having a wavelength in the wave band of approximately 622-780 nanometers, i.e. "red" light, is reflected toward a third wave plate 226. Reflected red light 246 strikes and passes through wave plate 226. In doing so, the polarization state of light 246 is altered or modified. All of light 246 reflects off a mirror 248 positioned on the back side of wave plate 226, and is directed toward dichroic reflective filter 220. Dichroic reflective filter 220 reflects light having a wavelength within a specified wavelength band (e.g. red light). The reflected light 250 is directed toward polarizing beam splitter/combiner 202, wherein that portion of light 250 having a "s" polarization is reflected to become part of output light 234. The portion of light 250 which is "p" polarized, by virtue of the alteration induced by wave plate 226, transmits through polarizing beam splitter/combiner 202. As can be appreciated, all of the "p" polarized light, of what was initially light element 206, passes through polarizing beam splitter 202 and is part of discarded light 251.

A similar process occurs with light element 208. Initially, the "red" light portion 252 of light element 208 is reflected by dichroic reflective filters 220 and 214, and the polarization state is altered by wave plate 226. The resultant red light 254 enters polarizing beam splitter/combiner 202, wherein that portion which is "p" polarized is transmitted to become part of output light 234, and that portion which is "s" polarized is reflected to become part of discarded light 251. Similarly, the "green" light portion 256 of light element 208 is reflected by dichroic reflective filters 218 and 212, as well as altered by wave plate 224. The resultant green light 258 enters polarizing beam splitter/combiner 202 wherein that portion which is "p" polarized is transmitted to become part of output light 234, and that portion which is "s" polarized is reflected to become part of discarded light 251. Further, the "blue" light 260 of light element 208 interacts with dichroic reflective filters 216 and 210, and is altered by wave plate 222, the end result of which is a blue light 262. Light 262 enters polarizing beam splitter/combiner 202 wherein that portion which is "p" polarized is transmitted to become part of output light 234, and that portion which is "s" polarized is reflected to become part of discarded light 251.

As a result of the alteration of light elements 206 and 208, output light 234 is a combination of both "s" and "p" polarized light, The discarded light 251 is also a combination of both polarization states, and is typically directed back toward the light source (not shown), wherein light 251 is ultimately converted to heat that must be dissipated.

It can be appreciated that the colors of blue, green and red disclosed in FIG. 2 are exemplary. Others colors, such as yellow and cyan, may replace or be added to the embodiment of FIG. 2 without departing from the intent of the disclosure. It can further be appreciated that each wave plate 222-226 may be individually addressed with a desired voltage. In this way, the amount of blue, green and red light resulting from light element 206, as well as the amount of color light resulting from light element 208, may be individually tailored and controlled for each color.

Figure 3:
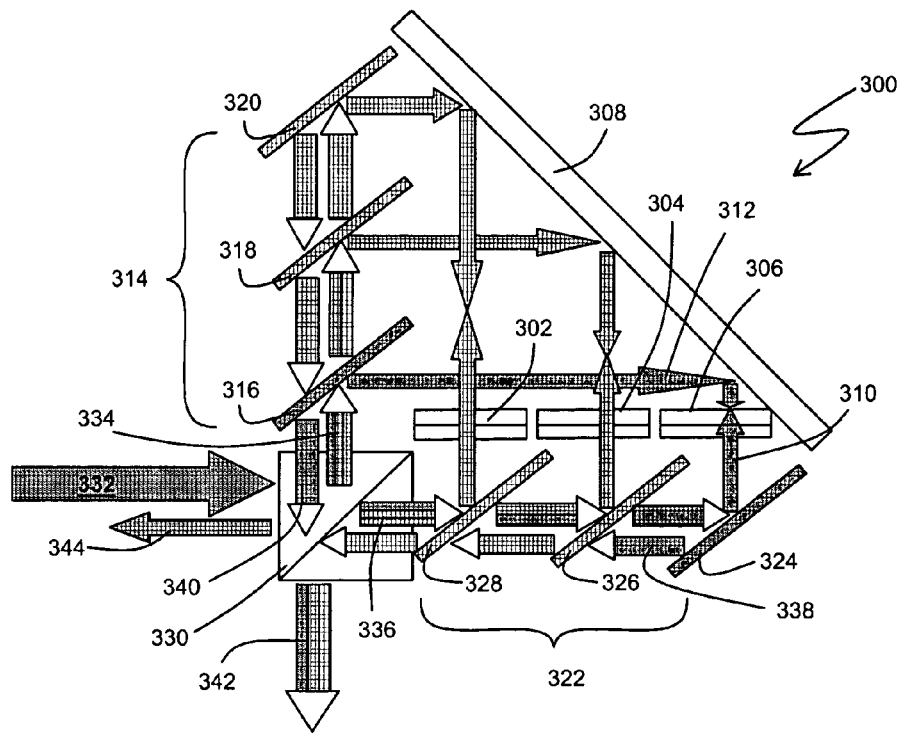
FIG. 3 is plan view of an electronic combinational color filter device having a single mirror, according to an embodiment.

Referring now to FIG. 3, an embodiment similar to that of FIG. 2 is presented. As such, the operation of electronic combinational color filter device 300 is similar to that of color filter device 200 as well. As shown, color filter device 300 includes a plurality of wave plates, i.e. wave plates 302, 304 and 306. Unlike the embodiment of FIG. 2, however, each wave plate 302-306 is coupled to the same, single mirror 308 positioned to reflect all of the light exiting from all wave plates 302-306 (e.g. blue light 310), as well as to reflect all light toward all wave plates 302-306 (e.g. blue light 312).

Further, a set 314 of dichroic reflective filters includes a "blue" light filter 316, a "green" light filter 318, and a "red" light filter 320. Similarly, a set 322 of dichroic reflective filters includes filters for the colors blue (filter 324), green (filter 326) and red (filter 328). In at least one embodiment, the dichroic reflective filters 316-320 and 324-328 are twisted nematic cells or films. In yet another embodiment, the filters 316-320 and 324-328 are cholesteric filters. A polarizing beam splitter/combiner 330 is positioned to receive incoming light 332, which may be a broadband light, and split the light 332 into a first element 334 and a second element 336. Similar to FIG. 2, element 334 is "s" polarized, and element 336 is "p" polarized.

Operationally, color filter device 300 functions in much the same way as color filter device 200. Blue, green and red light from two light elements (334 and 336) is reflected by dichroic reflective filters (316-320 and 324-328 respectively), altered by wave plates (302-306), reflected by a mirror (308), and reflected once again by the dichroic reflective filters (324-328 and 316-320 respectively). As the altered light (e.g. blue light 338 and blue light 340) enters polarizing beam splitter 330, that portion of each color of altered light which is "s" polarized is reflected, and that portion which is "p" polarized is transmitted. As a result of the operation of color filter device 300, color light 342, transmitted by color filter device 300, is a controlled combination of "s" and "p" polarizations, as well as a combination of blue, green and red light. Discarded light 344 is typically directed back toward the light source (not shown). As with color filter device 200, wave plates 302-306 are driven by an applied voltage to ultimately control the amount of blue, green, and red light combined to make color light 342.

In at least one embodiment, filters 316-320 and 324-328 may be cholesteric filters. As such, the filters 316-320 and 324-328 will reflect light that is within a specific wavelength band, and that has a specific polarization state, e.g. either right or left-hand polarization. Stated differently, filters 316-320 and 324-328 may be "mirrors" for one polarization state (e.g. right-hand polarization), and "windows" for the other polarization state (e.g. left-hand polarization). In this embodiment, therefore, not all light is discarded in the direction of light 344.

Figure 4:
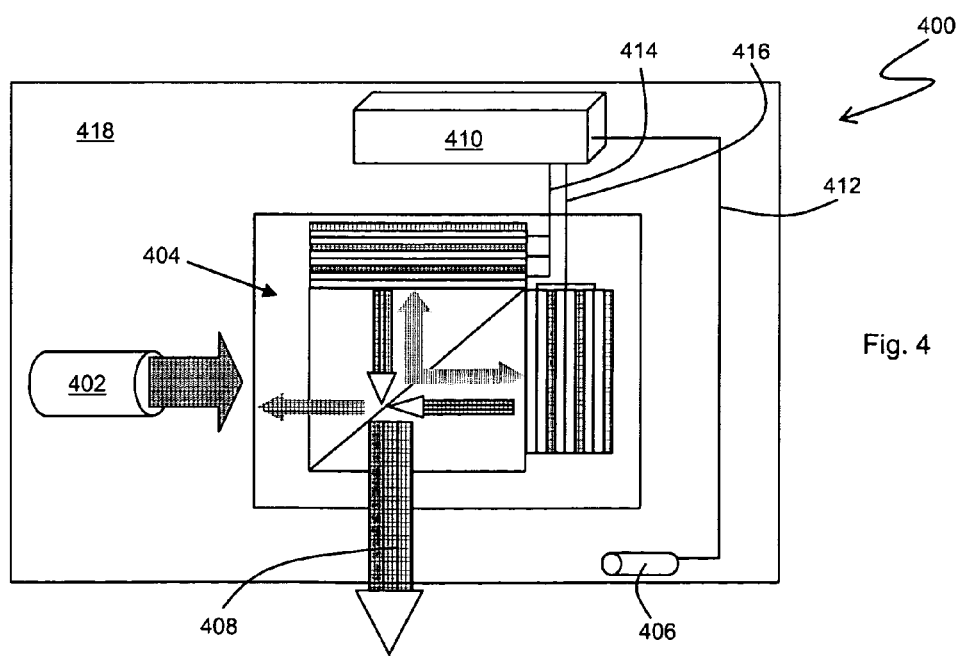
FIG. 4 is a schematic of an electronic combinational color lighting system, according to an embodiment.

As shown in FIG. 4, an electronic combinational color filter device may be part of an overall system for delivering color light, e.g. system 400. System 400 may include a light source 402. An electronic combinational color filter device 404 is optically aligned with light source 402. Color filter device 404 may be any of several embodiments, the specific details of which are encompassed in the present disclosure and depicted in FIGS. 1-3. A chromaticity monitor or color detector 406 is oriented to measure the chromaticity of a light 408 ultimately transmitted by system 400. The chromaticity of the transmitted light 408 is communicated to a controller 410, via an electrical wire 412, for further processing and use. Alternatively, chromaticity monitor 406 may simply record the characteristics of the transmitted light 408, and communicate the recorded data to controller 410, wherein the chromaticity of light 408 can be calculated. Of note, chromaticity monitor 406 may be employed with any or all of the embodiments disclosed in the present application. Also, chromaticity monitor 406 may include a polarizing beam splitter and two color sensors, such that color monitoring is also accomplished on the basis of polarization.

Chromaticity data is used to determine what adjustments, if any, should be made to the wave plates of the color filter device 404 by controller 410. Adjustments, in the form of varying voltages selectively applied to the wave plates, are used to tune or modify the color of transmitted light 408. The electrical current applied to the wave plates is carried via electrical lines, e.g. lines 414 and 416. All of the components (e.g. light source 402, color filter 404, etc.) may be contained within a housing 418. Alternatively, depending on the operational use of system 400, some components may be mounted outside housing 418.

Figure 5:
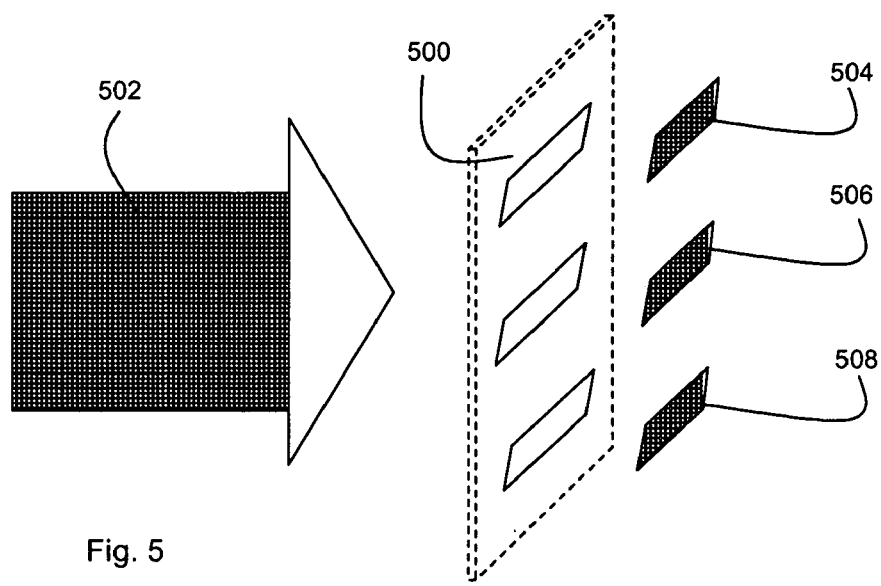
FIG. 5 is a perspective view of a gobo device for creating color images, according to an embodiment.
Figure 6:
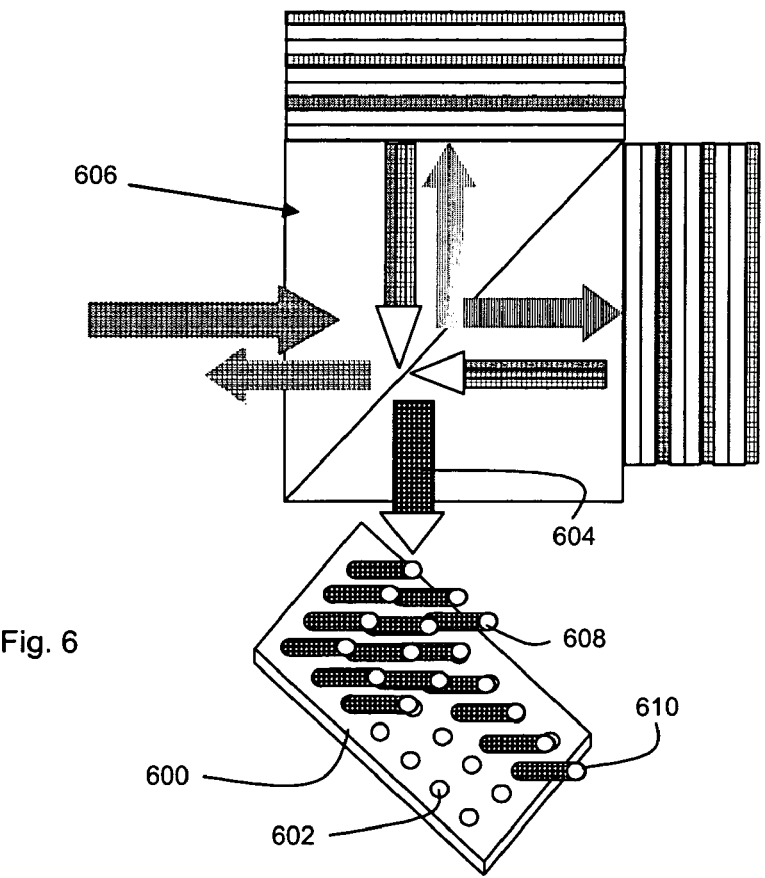
FIG. 6 is a perspective view of a reflective display device integrated with an electronic combinational color filter device, according to an embodiment.

A color lighting system, such as system 400, may include one or more spatial light modulators for creating a tailored color image. Referring now to FIGS. 5 and 6, one such modulator is a gobo 500. As shown in FIG. 5., the gobo 500 may be used to block a portion (not shown) of transmitted color light 502, while allowing other portions (504, 506 and 508) of color light 502 to pass through. The creative tailoring of gobo 500 allows color images having structure and form to be transmitted by system 400. It can be appreciated that gobo 500 is exemplary of gobo devices well known in the art, and that the specific shape, structure and design of a gobo will vary with each desired image.

Yet another modulator for creating a tailored color image having structure and/or shape is a reflective display device 600. A reflective display device, such as device 600, is a pixilated device. Each pixel, e.g. pixel 602, can either reflect or not reflect light striking the pixel 602, depending on an electronic signal sent to the pixel by a controller, e.g. controller 410 (FIG. 4). The reflectivity of a pixel 602 may be constantly changed to vary the image ultimately displayed by the reflective display device 600. As shown in FIG. 6, certain pixels may reflect light 604 transmitted by a electronic combinational color filter device 606, e.g. reflected light 608 and 610, while the reflectivity of other pixels (e.g. pixel 602) is set to zero. In one embodiment, reflective display device 600 is a digital light processor having a plurality of mirrored pixels. In at least one other embodiment, reflective display device 600 includes a plurality of "liquid crystal-on-silicon" pixels.

A reflective display device 600 may, therefore, actively create any color image that can be created using a gobo. Further, device 600 can quickly and efficiently change the projected image without having to physically (mechanically) move components, i.e. the gobo. The gobo and reflective display device presented in FIGS. 5 and 6 respectively, are simplified for understanding. It can be appreciated that actual modulators may be more complex, with many more smaller pixels, more intricate details, etc.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A method for generating color light comprising:
   receiving incoming light into a polarizing beam splitter/combiner;
   splitting the incoming light into a first element of light having a first polarization state and a second element of light having a second polarization state;
   selectively passing the first element of light through a first plurality of wave plates to alter the polarization state of the first element of light;
   selectively reflecting the first element of light off a first plurality of dichroic reflective filters, each filter reflecting a portion of the first element of light having a predetermined wavelength;
   selectively passing the second element of light through a second plurality of wave plates to alter the polarization state of the second element of light;
   selectively reflecting the second element of light off a second plurality of dichroic reflective filters, each filter reflecting a potion of the second element of light having a predetermined wavelength; and
   combining, in the polarizing beam splitter/combiner, reflected portions of the first element of light and reflected portions of the second element of light, to generate color light.

2. The method of claim 1, wherein the first plurality of wave plates and the second plurality of wave plates are the same wave plates.

3. The method of claim 2, further comprising reflecting light passing through each wave plate off a mirror.

4. The method of claim 1, further comprising creating an image using a spatial light modulator optically aligned with the generated color light.

* * * * *